Oct. 26, 1965    H. L. KEMM    3,214,184
STAIR CLIMBING WHEEL CHAIR
Filed Sept. 26, 1963    7 Sheets-Sheet 1

FIG.I.

INVENTOR.
HAROLD L. KEMM
BY Howson & Howson
ATTYS.

Oct. 26, 1965  H. L. KEMM  3,214,184
STAIR CLIMBING WHEEL CHAIR
Filed Sept. 26, 1963  7 Sheets-Sheet 4

FIG. 7

INVENTOR.
HAROLD L. KEMM
BY Howson & Howson
ATTYS.

Oct. 26, 1965 H. L. KEMM 3,214,184
STAIR CLIMBING WHEEL CHAIR
Filed Sept. 26, 1963 7 Sheets-Sheet 5

INVENTOR.
HAROLD L. KEMM
BY Howson & Howson
ATTYS.

Oct. 26, 1965   H. L. KEMM   3,214,184
STAIR CLIMBING WHEEL CHAIR
Filed Sept. 26, 1963   7 Sheets-Sheet 6

FIG.9

INVENTOR.
HAROLD L. KEMM
BY Howson & Howson
ATTYS.

United States Patent Office 3,214,184
Patented Oct. 26, 1965

3,214,184
STAIR CLIMBING WHEEL CHAIR
Harold L. Kemm, 210 Newton Road, Warminster, Pa.
Filed Sept. 26, 1963, Ser. No. 311,694
9 Claims. (Cl. 280—5.26)

The present invention relates generally to wheel chairs and more particularly to a wheel chair controlled and propelled solely by the occupant adapted to ascend and descend stairs and to negotiate similar obstructions without the assistance of an attendant.

There have been numerous attempts in the past to improve the mobility of handicapped persons by the development of a wheel chair which could be adapted for movement on stairs, over curbs and similar obstructions. However there has heretofore been no recognized satisfactory solution to the problem. Some of the shortcomings which have characterized previous developments of this type include: inability to traverse stairs without an attendant; heavy, bulky designs not susceptible of a folding construction; unreasonably expensive construction; and construction preventing normal wheel chair functions. A practical design for such a chair has thus not previously been available although the demand has been long existent, particularly by those handicapped persons unable to obtain employment because of an unfortunate and now unnecessary lack of mobility.

Accordingly, a first object of the present invention is to provide a wheel chair adapted to traverse stairs and other obstructions in a safe, and comfortable manner, controlled and powered solely by the occupant of the chair.

A further object of the invention is to provide a wheel chair as described which is adapted to negotiate steps of varying dimensions, including means for automatically compensating for such dimensional variations.

An additional object of the invention is to provide a wheel chair as described which is adapted to a folding construction, is light weight, easily transported, and economical to manufacture.

Another object of the invention is to provide a stair-climbing wheel chair as described which permits conventional wheel chair operation over level surfaces.

A still further object of the invention is to provide a wheel chair as described which in traversing stairs is propelled by an irreversible drive train which prevents uncontrolled descent of the chair in the event of careless operation or incapacity of the occupant.

Still another object of the invention is to provide a wheel chair as described which for ascent and descent of stairs is propelled by a single drive means which performs all of the drive functions incident to entering, negotiating, and leaving a stairway.

A further object of the invention is to provide a wheel chair as described which is readily adaptable to propulsion by self-contained power units such as battery powered motors and the like.

Another object of the invention is to provide a wheel chair as described characterized by a simplicity of construction, and an ease and smoothness of operation to insure the continuous comfort of the occupant while traversing various obstacles.

Additional objects and advantages of the invention will be more readily apparent from the following detailed description of an embodiment thereof when taken together with the accompanying drawings in which:

FIG. 8a-h is a series of schematic elevational views illlustrating the maner in which the embodiment negotiates a stairway;

Referring to FIGS. 1–4 of the drawings, the embodiment illustrated includes tubular side frame members 10 and 12 between which are supported the seat 14 and the seat back 16. Footrests 18 and 20 are foldably attached to the side frame members. Conventional hand drive wheels 22 and 23 support the side frame members during conventional wheel chair operation in conjunction with the usual small front wheels 24 and 25 pivotally secured to the side frame members.

The above-recited components are those basic to a conventional wheel chair and it should be noted that the arrangement of the components is substantially the same as in a conventional chair. The structure in addition is collapsible in the usual manner, the seat folding to permit the side frame members and attached components to move into parallel contiguous relationship. As appears most clearly in FIGS. 2 and 4, the stair-climbing mechanisms of the embodiment are located within or in closely spaced parallel relation with the side frame members. The mechanisms of each opposed side frame member are identical and independent, there being no transverse elements other than the conventional collapsible seat, seat back and braces which would complicate or prevent the folding of the wheel chair.

The side frame members 10 and 12 are of a light weight, tubular construction which includes a horizontal arm rest 26 and vertical seat back supporting element 28, the looped continuation 30 of which provides a convenient handle for manipulating an unoccupied chair or for assisting in the maneuvering of the chair when occupied. The forward end of each side frame member includes vertical frame element 32 to which a footrest is pivotally secured, and a second outwardly spaced frame element 34 to which a small front wheel is pivotally mounted. The side frame members 10 and 12 are maintained in the proper spaced relationship by the seat frame assembly 36 and diagonal braces 38 and 40.

For stair-climbing functions, the chair is supported on and driven by synchronously rotating upper and lower spiders in a manner to be presently described. In order to permit engagement of the stairs by the spiders, the large hand drive wheels must in some manner be relocated to permit the chair to assume a position as close to the steps as possible. The manner in which this is accomplished by means of the same drive mechanism used to propel the chair along stairways and the manner in which the hand drive wheels and supporting frame assist in the entering and leaving of stairs are important features of the invention.

In view of the identical structure of each side of the chair, the side of the chair to the occupant's left will be described in detail, with the numerical designation of the elements thereof being also applied to the corresponding elements of the opposite side. Referring to the specific structure of the mechanism of each side frame member, as seen for example in FIG. 3 the large hand drive wheel 23 is journalled in a cantilever manner from the tubular wheel-supporting frame 42 which is rotatably mounted on the main drive shaft 44. As shown in the enlarged sectional view of FIG. 7, the main drive shaft 44 is journalled by means of bearings 46 and 48 in the control box 50 formed by the side plates 51a and 51b attached to the tubular elements of the side frame member 12 adjacent the seat back 16. For normal wheel chair operation, the tubular wheel-supporting frame 42 is locked in the position shown, for example, in FIGS. 1–4 and does not rotate with or about the drive shaft 44. The manner in which such rotation is effected and the structure permitting selective rotation of the wheel-supporting frame is discussed below.

Secured to the outer end of the main drive shaft 44 is the upper spider 52 which is keyed to the drive shaft for rotation therewith. A lower spider 53 rotatably mounted outwardly from the frame element 32 and adapted to rotate between the frame elements 32 and 34 is driven synchronously with the upper spider 52 by means of drive shaft 54 journalled within the tubular diagonal frame element 56 extending between the control box 50 and the lower spider mounting on the vertical frame element 32. The drive shaft 54 is driven by the shaft 58 perpendicular thereto and engaged therewith by means of bevel gear 60. The shaft 58 extends through the forward corner of the arm rest 26 and the end thereof is fitted with a ratchet handle 62 conveniently positioned for actuation by the chair occupant. The ratchet of the handle 62 is reversible to provide ratchet action in either direction of rotation.

Figure 6:
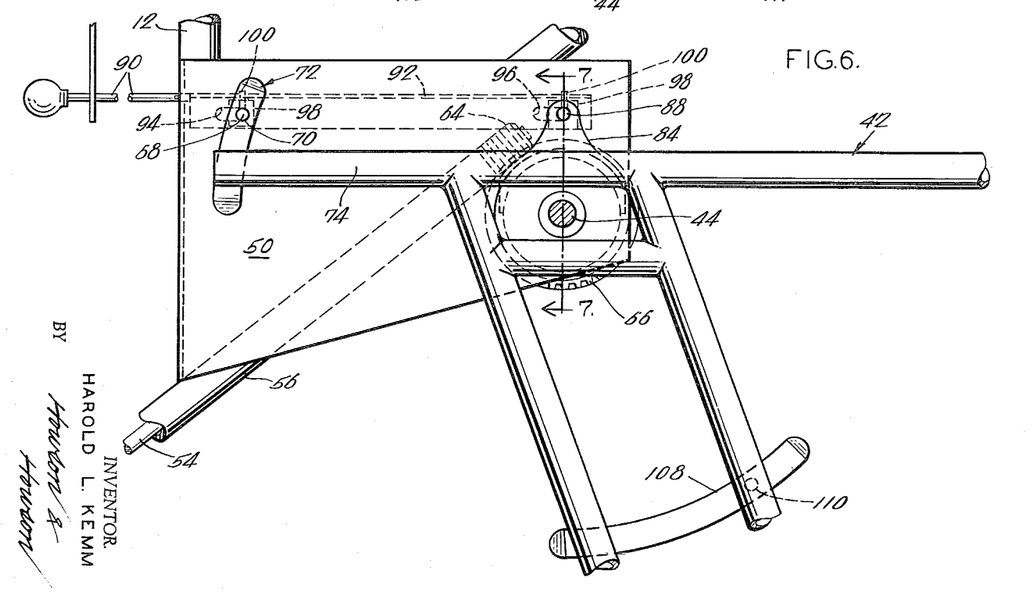
FIG. 6 is a partial side elevation view of the mechanism shown in FIG. 5.

As shown for example in FIG. 6, the upper end of the drive shaft 54 is provided with a keyed worm 64 in driving engagement with the gear 66 keyed to the main drive shaft 44. The lower end of the drive shaft 54 is similarly provided with a worm and gear arrangement for driving the lower spider at the same speed and in the same direction as the upper spider. Thus by means of actuation of the ratchet handle 62 the upper and lower spiders are synchronously rotated by means of the irreversible worm and gear drives.

Figure 1:
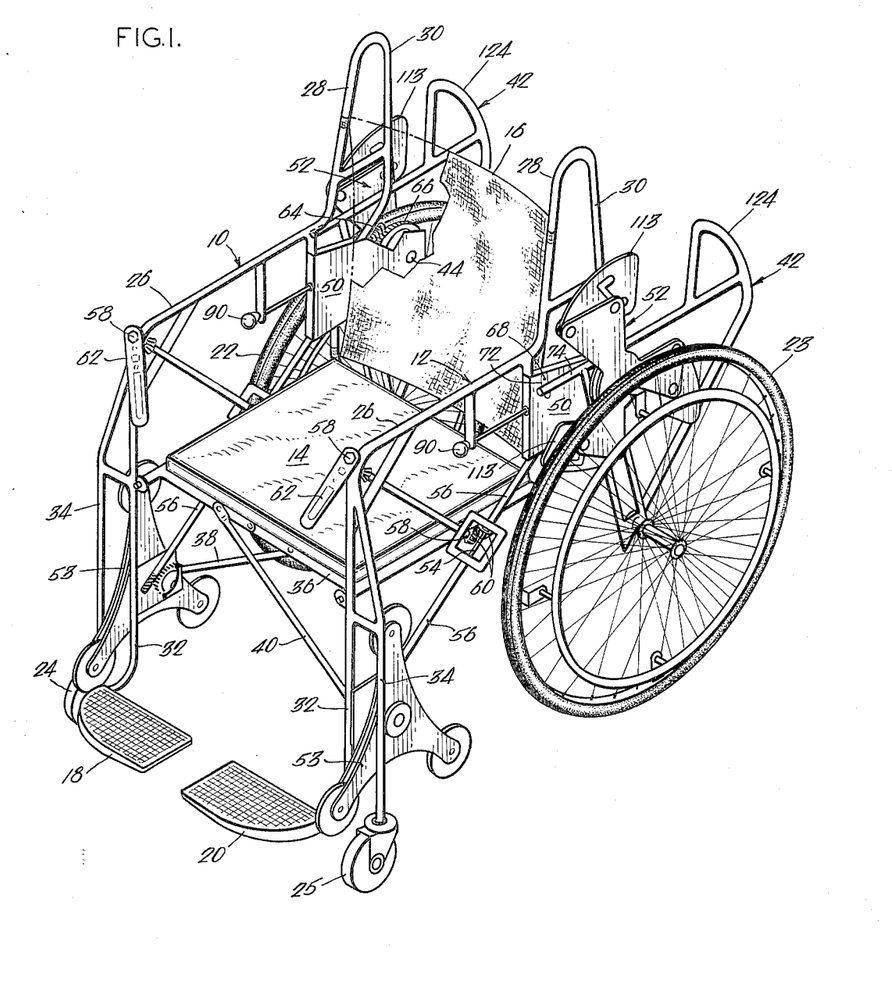
FIG. 1 is a perspective view showing a wheel chair embodying the present invention with the wheels in the position for conventional wheel chair operation over plane surfaces.
Figure 2:
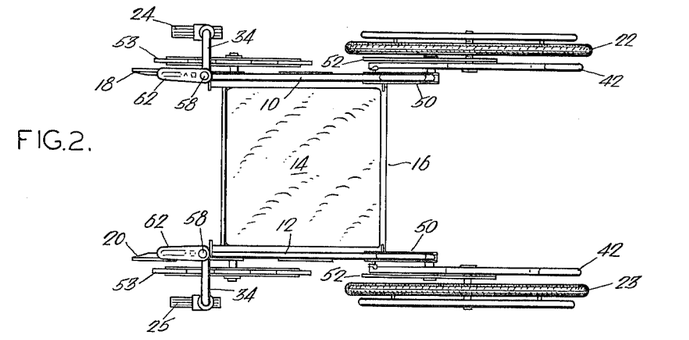
FIG. 2 is a plan view of the embodiment shown in FIG. 1.
Figure 3:
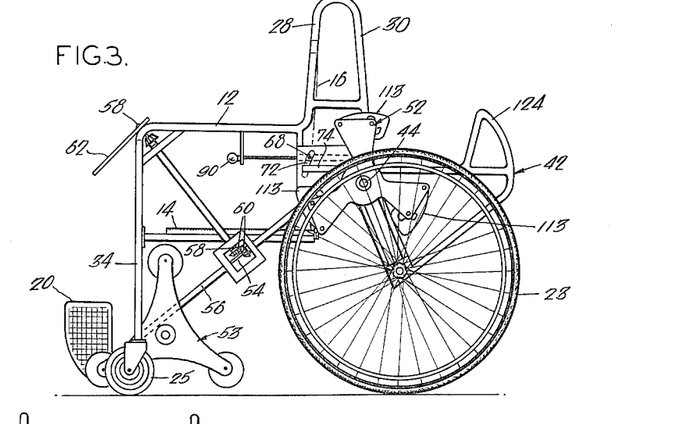
FIG. 3 is a side elevation view of the embodiment shown in FIG. 1.
Figure 4:
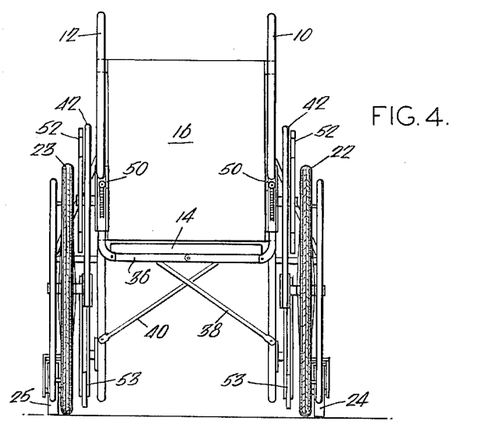
FIG. 4 is a rear elevation view of the embodiment shown in FIG. 1.
Figure 5:
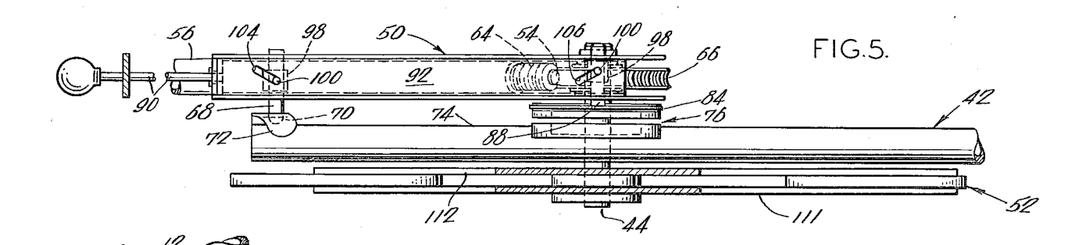
FIG. 5 is a partial enlarged plan view of the embodiment showing details of the drive mechanism for stair climbing operation.
Figure 7:
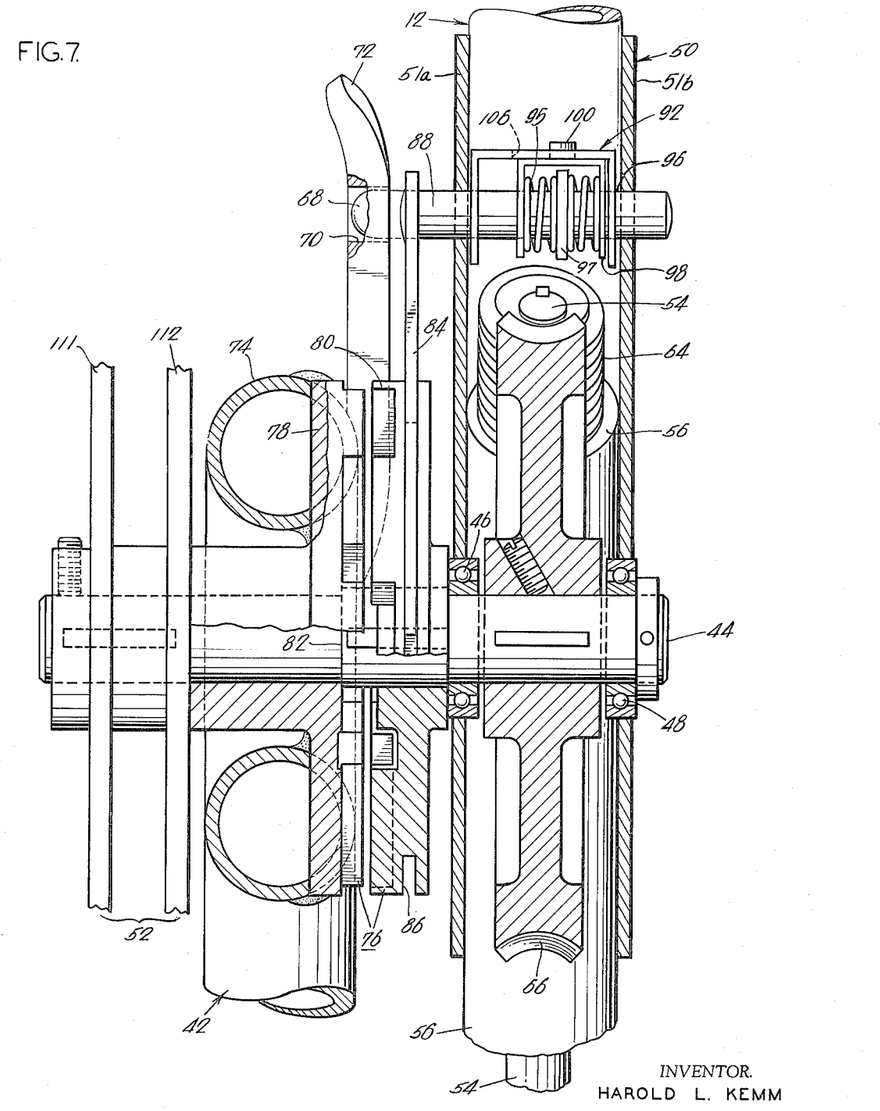
FIG. 7 is a sectional view taken along line 7—7 of FIG. 6.

Referring to FIGS. 5, 6 and 7, the details of the mechanism for selectively controlling the rotation of the wheel-supporting frame 42 is shown in detail. The frame 42 is freely rotatable on the main drive shaft 44 and is maintained in the position illustrated for normal wheel chair functioning by the horizontal pin 68 extending from the control box 50 and engaging hole 70 of the arcuate segment 72 of the tubular frame element 74.

For rotation of the wheel-supporting frame 42, a clutch 76 is provided which consists of coacting clutch plates 78 and 80 respectively attached to the frame 42 and slidably keyed to the main shaft 44. Shoulder 82 on the shaft prevents inward movement of the frame member 42. The clutch plate faces are of the well known positive-engaging interlocking type and when engaged are maintained in engagement by the rotational forces acting thereon. The clutch plate 80 slidable on the main shaft 44 is actuated by the shifting fork 84 coacting with the peripheral slot 86 in the clutch plate 80. The shifting fork is attached to horizontal pin 88 of the control box 50 and is coordinately actuated along with the pin 68 by control means to be presently described such that when the pin 68 is engaged the pin 88 will urge the clutch into the disengaged position. Conversely, when the pin 88 is urging the clutch into the engaged position, the pin 68 will be urged into the disengaged position.

The control mechanism for actuating the pins 68 and 88 in the aforesaid manner includes ball-tipped control arm 90 secured to channel-shaped element 92 in the control box 50. The element 92 is supported by the pins 68 and 88 passing therethrough and is slotted at 94 and 96 to permit horizontal movement across the pins. Secured centrally to each pin 68 and 88 is a washer 97 on each side of which are springs 95 urging a U-shaped member 98 into a central position with respect to the washer 97. The U-shaped member 98 is slidable on the pin and the upper portion thereof is in slidable relation with the equivalent portion of the channel element 92. Extending above the U-shaped members are cam pins 100 coacting with diagonal slots 104 and 106 in the channel element 92. The diagonal slots 104 and 106 are angled in opposed directions such that movement of the channel element 92 by means of the control arm 90 will have the effect of moving the U-shaped member of the pin 68 in one direction and the U-shaped member of the pin 88 in the opposite direction to provide with a single control movement the two-fold function of controlling the clutch 76 and the pin 68.

As shown in FIG. 6, a further arcuate segment 108 secured to the wheel-supporting frame 42 includes an additional hole 110 for engagement by the pin 68 when the wheel-supporting frame 42 reaches the stair-climbing position. This will be discussed further below with respect to the operation of the invention.

Figure 9:
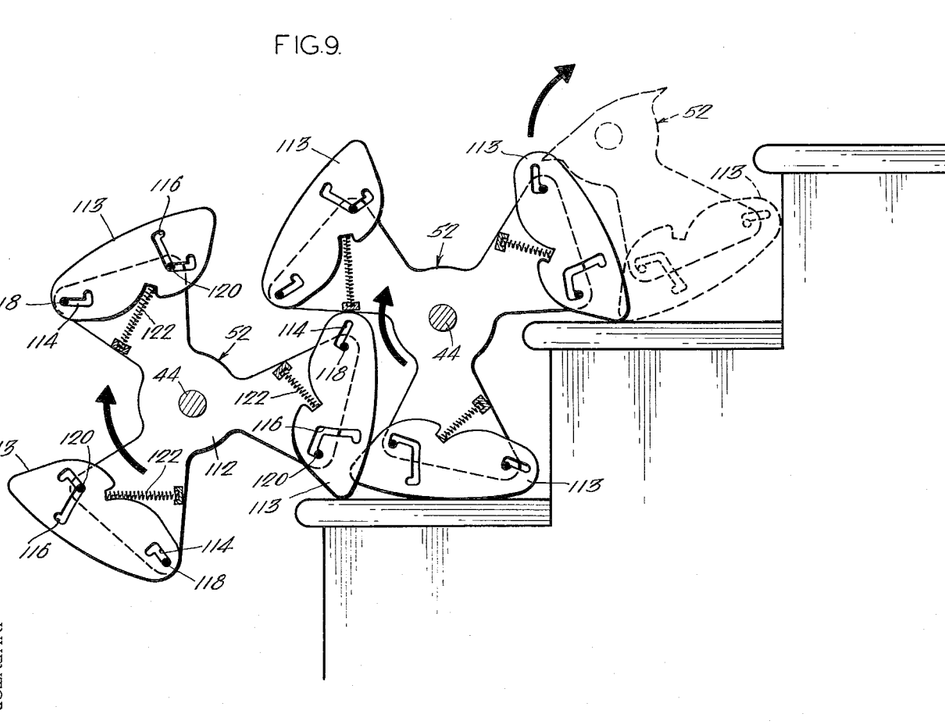
FIG. 9 is a schematic view illustrating the operation of the apparatus of the embodiment automatically adaptable to steps of varying dimensions, showing the functioning of the apparatus in ascending steps.
Figure 10:
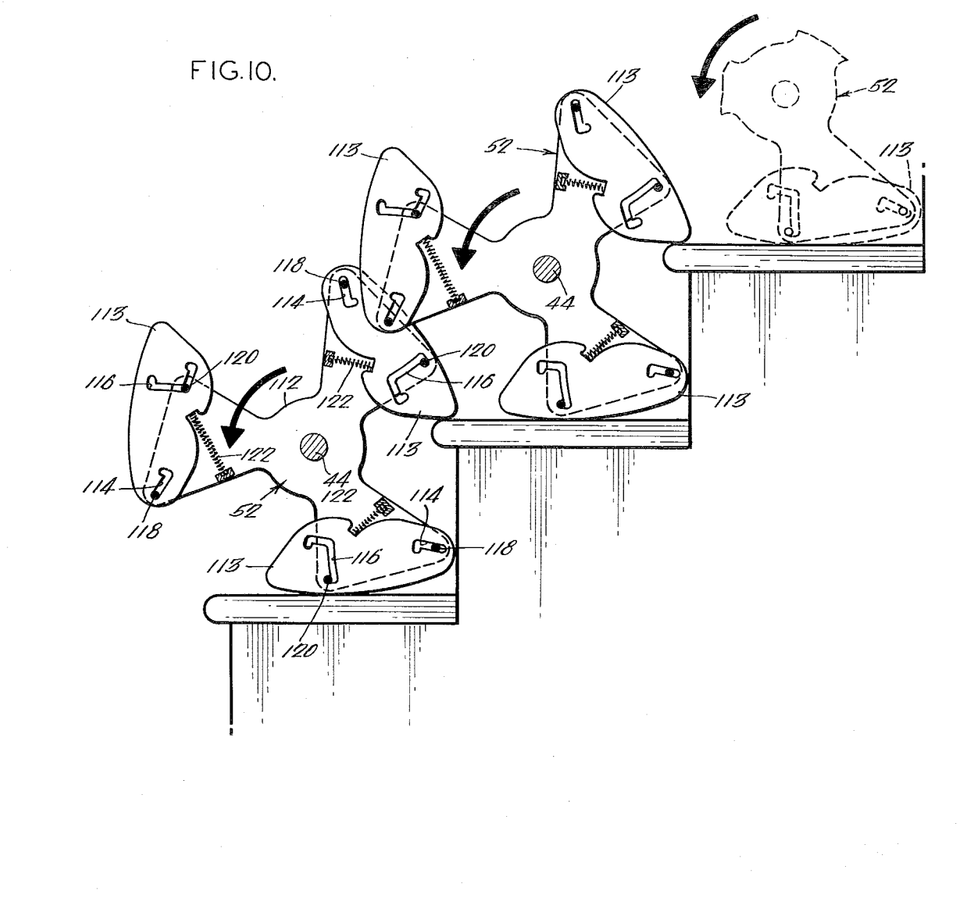
FIG. 10 is a view similar to FIG. 9 illustrating the descent operation of the apparatus.

The upper spider 52 consists of spaced spider plates 111 and 112 between the outer ends of the arms of which are secured spider shoes 113 by means of the spring-loaded, pin and slot arrangement illustrated in FIGS. 9 and 10. The toes of the spider shoes are adapted to extend during ascent of steps to effectively lengthen the stride of the spider and insure a sufficiently deep engagement of each stair. Upon descent, the shoes are adapted to shorten the spider stride for the same purpose.

The shoes 113 include a slot 114 in the heel thereof and a further slot 116 in the toe, which slots are engaged by pins 118 and 120 at the extremities of the spider arms. Springs 122 bear diagonally against each spider shoe to urge the shoe into a non-weight bearing position which permits the shoe to lock in an extended or retracted position upon contact with a stair depending upon the direction of travel of the spider.

For operation of the chair in the normal manner over level surfaces, the wheel-supporting frame 42 is locked in the position shown in FIGS. 1–4 by positioning the control arms 90 in the rearward position illustrated in FIGS. 5 and 6 thus engaging the pin 68 in the hole 70 of the wheel-supporting frame segment 72 and positioning the clutch plate 80 in the disengaged position. The ratchet handles are manipulated to position the lower spiders 53 in the ground-clearing position illustrated, and the chair is then in condition for operation in a conventional manner, the added mechanism of the present invention being compactly disposed along the side frame members thus presenting no encumbering or projecting structures which might prevent normal wheel chair usage.

For stair climbing operation, the chair is backed up to a flight of stairs and the control arms 90 are pulled forward to urge the release of the pins 68 and the engagement of the clutches 76. This has the effect of moving the respective U-shaped members 98 so as to compress the springs 95 to urge the pins 88 outwardly and the pins 68 inwardly. However, the clutches will not engage until the clutch plate faces are in a compatible position, and the pins 68 will not disengage until the weights of the wheel-supporting frames are removed therefrom by engagement of the clutches and a take-up of the wheel-supporting frame weights by the main shaft drives.

In view of the above, the ratchet handles 62 must be rotated following the pulling of the control arms 90 until the clutches 76 are engaged. When this occurs, the main drive shafts are rotated slightly to release the weight on the pins 68 which are then automatically withdrawn from the holes 70 by the action of the control box springs. The chair is then in condition for climbing and by the simple and convenient operation of the ratchet handles 62 the main drive shafts are rotated which with the clutches 76 engaged also rotates the wheel-supporting frames to swing the wheels toward the front of the chair and upwardly out of the way.

Figure 8A:
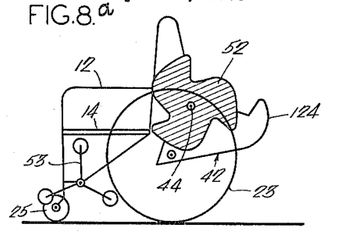
Figure 8B:
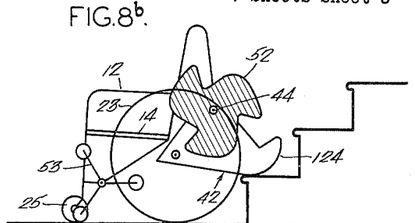
Figure 8C:
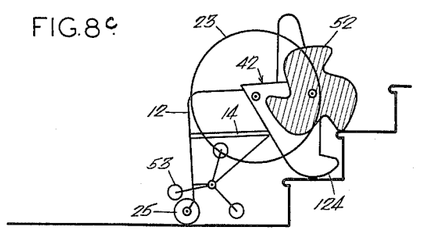

As the wheels are moved in a forward and upward arc, the upper spiders are as a result in a better position to engage the stairs. However, in view of the fact that the lower spiders are still adjacent or in contact with the level floor, means must be provided to advance the chair onto the stairs such that the upper spiders contact the second step rather than the first step such that the upright disposition of the chair may be maintained throughout the entrance of the chair onto the stairs. Means are provided for this purpose in the form of extending portions 124 of the wheel-supporting frames 42 which as will be noted in FIGS. 8b and 8c initially contact the first step of a flight of stairs and serve to support and advance the chair into a position whereby the upper spiders may engage the second step of the flight and successive steps, the extending portions rotating upwardly into a position adjacent the side frame members of the chair in the stair-climbing position of the chair shown in FIG. 8d.

Figure 8D:
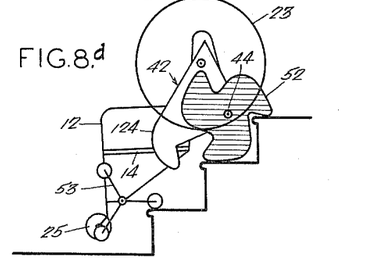

Prior to reaching the position of FIG. 8d, the control arms 90 are pushed rearwardly to urge the pins 68 and 88 into their initial position but in which the pin 68 engages the hole 110 in the arcuate segment 108. When the hole 110 is positioned opposite the pin 68, the pin under spring force will engage the hole. At this point the clutch is still engaged due to the weight of the chair acting therethrough, and the main drive shaft must be backed off slightly to permit the weight to be taken by the pin 68, at which time the clutch disengages. With the pin 68 engaged in the hole 110, the chair is in the stair-climbing position shown in FIG. 8d and in this position can successively climb any number of steps without further control adjustments. The synchronously driven upper and lower spiders successively engage each step in a known manner to advance the chair therealong. Since the drive train for the spiders is a worm and gear arrangement, the drive is irreversible and release of the ratchet handles would not occasion a downward movement of the chair. Thus incapacity or carelessness of the occupant would not cause the chair to plunge downwardly out of control.

Figure 8E:
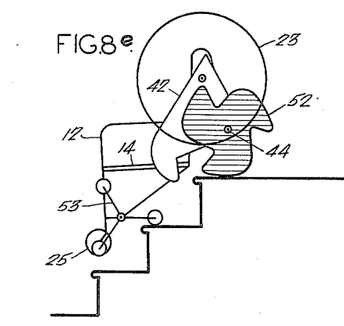
Figure 8F:
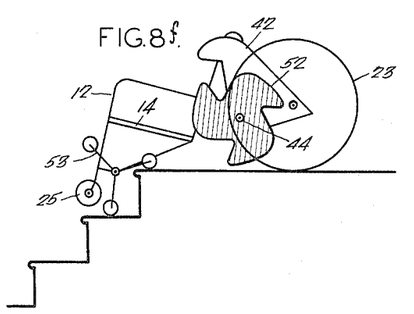
Figure 8G:
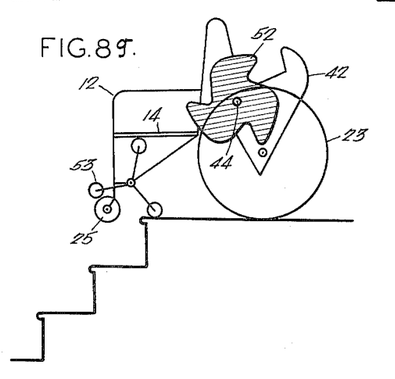
Figure 8H:
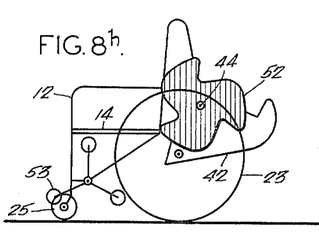

As the chair reaches the top step as shown in FIG. 8e, the control arms 90 are again pulled out to reengage the clutches and disengage the pins 68 thus starting the wheel-supporting frames and wheels in rotation in an arc rearwardly of the chair as shown in FIG. 8f as the chair negotiates the top step. Engagement of the clutches as in the previous instance described above must be accompanied by a slight reversal of the drive mechanism to release the weight from the pins 68 to permit withdrawal thereof. In the position shown in FIG. 8f, the extending portions 124 of the wheel-supporting frames are directed upwardly and thus permit the hand drive wheels 22 to pick up the weight of the chair and rotate beneath the chair as shown in FIG. 8g. At this point the control arms 90 are pushed into the rearward position so as to urge the disengagement of the clutches and the engagement of the pins 68 upon return of the wheel-supporting frame to the normal wheel chair position shown in FIG. 8h. The chair may then be operated in a conventional manner on the upper level.

For descent of a flight of stairs, the above operation is reversed in all details and the chair function in the reverse manner to that described above. The chair may be prepared for descent prior to advancement to the edge of the steps by adjustment into the position shown in FIG. 8g at a spot remote from the stair edge and then advanced by means of the hand wheels to the proper descent position shown in FIG. 8g.

Although the chair is inclined rearwardly briefly during the operation shown in FIG. 8f, at no time is there a substantial forward inclination of the chair which might dislodge or unduly excite the occupant of the chair. The slight rearward inclination shown in FIG. 8f may in fact be desirable at the top of the stairs since the center of gravity of the occupied chair is lowered and the occupant is thus placed in a more relaxed state of mind.

It will be noted that the upper spider in the schematic views of FIG. 8a–h is shown without the spider shoes illustrated in FIGS. 9 and 10. Althought the spider shoes are preferably included, the chair is operable without the shoes although it is not capable of such versatile operation as when provided with the shoes. Without the shoes, the chair is limited to a specific rise plus tread dimensional constant and may thus be used only upon stairs which conform to the design constant selected. Architectural standards specify a 17½ inch constant rise plus tread dimension aand a chair constructed without the shoes is preferably designed to this constant. The used of the shoes provides an automatic adjustment for stairs of various rise and tread combinations.

As shown in FIG. 9, the extended spider shoes during the ascent of the chair lengthen the stride of the spider to advance the chair as deeply as possible into the step. There is preferably contact of the heel of the shoe with the stair riser as indicated to insure the maximum depth of the spider on the step and the safe operation of the chair.

On descent as illustrated in FIG. 10, the shoe retracts upon contact with the step so as to shorten the spider stride and again position the spider as far back from the step as possible, preferably in contact with the stair risers. Not only is this spider shoe arrangement desirable to adapt the chair to stairs having different tread and riser dimensions, but in addition on stairs of optimum dimensions it introduces a safety factor in continually acting to position the chair toward the rear of the stair treads.

For operation of the chair over curbs and other low obstructions the apparatus may be utilized by rotating the wheel-supporting frame such that the extending portion 124 contacts the ground in front of the obstruction, thus lifting the chair into the air and over or onto the obstruction. Thus, although the arrangement shown is designed primarily for stair climbing operation, curbs or terraces and other similar low obstructions can be surmounted using a different operational technique.

The invention is adaptable to construction of light weight materials such as aluminum and nylon and the simplicity of the arrangement permits manufacture of the unit at a reasonable cost. The chair may be easily folded and transported and if desired could be adapted to a self-contained power unit. The wheel chair illustrated has an overall width only 1½ inches greater than that of the standard chair and a weight increase of only about 15 pounds.

The chair is capable of negotiating all types of stairways including curving stairways and those having L-shaped landings. The chair can negotiate an L-shaped landing as small as three feet square and thus after a brief period of practice an occupant should be able to negotiate the majority of stairways as well as such common obstacles as curbs without difficulty.

Manifestly, changes in details of construction can be effected by those skilled in the art without departing from the spirit and the scope of the invention as defined and limited solely by the appended claims.

I claim:

1. A stair-climbing wheel chair comprising opposed side frame members, a seat disposed between said side frame members, a wheel-suporting frame extending from and selectively rotatable with respect to each said side frame member, hand drive wheels journalled on said wheel-supporting frames, said wheel-supporting frames being rotatable from a normal lowered position to a raised stair-climbing position, upper and lower spiders journalled on each said side frame member, drive means for synchronously driving said upper and lower spiders, drive means for selectively rotating said wheel-supporting frames, said wheel-supporting frames in the normal lowered position having a rearwardly extending portion adapted to engage a first step of a flight of stairs during rotation to the stair climbing position such that said upper spiders engage the second and subsequent steps in conjunction with said lower spiders, said wheel-supporting frames and said hand drive wheels being raised to the stair climbing position during the further negotiation of the stairs.

2. The invention claimed in claim 1 wherein said drive means for synchronously driving said upper and lower spiders constitutes the drive means for rotating said wheel-supporting frames, and control means permitting selective rotation of said wheel-supporting frames during the driving of said upper and lower spiders.

3. The invention as claimed in claim 2 including means for increasing the length of the upper spider arms during ascent of stairs and for decreasing the length of the spider arms during descent thereof comprising a shoe disposed on each spider arm, and means on each spider shoe pivotally mounting said shoe such that upon ascent the shoe is urged into and locked in an extended position by contact with the step, and upon descent is urged into and locked in a retracted position upon contact with the step.

4. The invention as claimed in claim 2, said control means including means for locking said wheel-supporting frames in the normal lowered position and in the raised stair-climbing position.

5. The invention as claimed in claim 4 wherein said drive means for synchronously driving said upper and lower spiders and for rotating said wheel-supporting frames constitutes an irreversible gear drive adapted for manual actuation by the chair occupant.

6. The invention as claimed in claim 4 wherein said drive means for synchronously driving said main drive shaft of said lower spider constitutes an irreversible gear drive adapted for manual actuation by the chair occupant.

7. A stair climbing wheel chair comprising opposed side frame members, a seat disposed between and joining said side frame members, a main drive shaft journalled in and extending from each of said side frame members, a wheel-supporting frame freely rotatable on said main drive shaft, a hand drive wheel journalled on said wheel-supporting frame, an upper spider located on said main drive shaft secured thereto for rotation therewith, a lower spider journalled to each said side frame member, drive means for synchronously driving said main drive shaft and said lower spider, means permitting selective rotation of said wheel-supporting frame by said main drive shaft, control means for selectively locking said wheel-supporting frame in a normal lowered position or in an elevated stair-climbing position, said wheel-supporting frame in the normal lowered position having a rearwardly extending portion extending beyond the hand drive wheel, said rearwardly extending portion adapted for ascent of stairs to engage a first step of a flight of stairs during rotation of said wheel-supporting frame into the elevated stair-climbing position thereby advancing said upper spider directly onto the second step of the stairs, said upper spider in conjunction with said synchronously driven lower spider negotiating successive steps with said wheel-supporting frame in the elevated stair-climbing position, said wheel-supporting frame being rotated behind and below said upper spider upon reaching the top of the stairs and returned to the normal lowered position thereby maintaining the normal upright position of the chair throughout the stair-climbing operation.

8. In a device for climbing stairs having at least one multi-armed spider, the improvement comprising means for increasing the length of the spider arms during ascent of stairs and for decreasing the length of the spider arms during descent thereof comprising a shoe disposed on each spider arm, and means on each spider arm movably mounting said shoe such that upon ascent the shoe is urged into and locked in an extended position by contact with a step, and upon descent is urged into and locked in a retracted position upon contact with the step.

9. In a device for climbing stairs having at least one multi-armed spider, the improvement comprising means for increasing the length of the spider arms during ascent of stairs and for decreasing the length of the spider arms during descent thereof comprising a shoe disposed on each spider arm, said shoe being secured to the spider arm by a pin and a slot arrangement such that upon ascent the shoe is urged into and locked in an extended position by contact with a step, and upon descent is urged into and locked in a retracted position upon contact with a step.

References Cited by the Examiner

UNITED STATES PATENTS

| 2,400,824 | 5/46 | Jackson | 180—8 |
| 2,931,449 | 4/60 | King | 180—8 |
| 3,133,742 | 5/64 | Richison et al. | 280—5.28 |
| 3,169,596 | 2/65 | Wright | 180—7 |

FOREIGN PATENTS

| 650,856 | 10/28 | France. |
| 752,817 | 7/56 | Great Britain. |

OTHER REFERENCES

Pamphlet: "Wanted—A Stair Climbing Wheel Chair," January 1962, National Inventors Council (U.S. Department of Commerce), pp. 27–38 only.

BENJAMIN HERSH, *Primary Examiner*.

LEO FRIAGLIA, *Examiner*.